Patented Jan. 12, 1943

2,307,876

UNITED STATES PATENT OFFICE 2,307,876

PRODUCTION OF GLAZED FABRICS

Harry Corteen, Manchester, England, assignor to Tootal Broadhurst Lee Company Limited, Manchester, England No Drawing. Application January 12, 1940, Serial No. 313,512. In Great Britain January 13, 1939

1 Claim. (Cl. 117—76)

This invention relates to an improvement in the production of glazed fabrics.

According to the invention a fabric is treated with a viscous dispersion emulsion or solution of an artificial polymerised material of a rubber-like nature for example, so as to form a film on the fabric and then subsequently coated with a resin composition of an alkyd resin and a resin of the urea-formaldehyde type (including thiourea and analogous bodies having the grouping nitrogen carbon nitrogen).

One of the emulsions sold by the I. G. Farbenindustrie A. G. under the trade names Igeplast (polymerized esters of acrylic acid or its derivatives), for example Igeplast E., E. T. L., E. S., with, or preferably without a filler, is applied to the fabric. The emulsion may be so viscous that it does not penetrate to the other side. The fabric is then dried. Alternatively, the polymerised material, or material and filler, may be precipitated on the fabric by addition of acid.

The fabric is then coated with a resin composition on top of the dried emulsion and filler with which the fabric has been treated, such a resin composition being a mixture of Bedafin 2001 (I. C. I.) (registered trade-mark), which is glycerol-phthalic-anhydride-urea-formaldehyde composition and Paralac 285X (I. C. I.) (registered trade-mark modified glyptal phthalic anhydride plus oil), which acts as a plasticiser. Cellulose nitrate may be added to this mixture. It may be printed with a colour first if desired, to produce a pattern. The fabric is then heated at a suitable temperature.

The product is fast to ironing and moderate washing.

The invention also includes the treatment of fabrics with polymerised hydrocarbons of the ethylene series, e. g., those sold under the trade names Polythene or Oppanol, and then with a mixed resin composition of the type described.

I claim as my invention:

A glazed chintz fabric having a first coating of an artificial rubber-like polymer of an acrylic ester derivative and a superimposed second coating containing a urea-formaldehyde resin, an alkyd resin and a plasticiser.

HARRY CORTEEN.